(12) United States Patent
Guo et al.

(10) Patent No.: US 12,531,584 B2
(45) Date of Patent: Jan. 20, 2026

(54) NOISE FIGURE PERFORMANCE IN RECEIVE PATHS OF FRONT END MODULES

(71) Applicant: SKYWORKS SOLUTIONS, INC., Irvine, CA (US)

(72) Inventors: Jiunn-Sheng Guo, Eastvale, CA (US); Tianming Chen, Newbury Park, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 503 days.

(21) Appl. No.: 18/084,497

(22) Filed: Dec. 19, 2022

(65) Prior Publication Data

US 2023/0231587 A1 Jul. 20, 2023

Related U.S. Application Data

(60) Provisional application No. 63/293,845, filed on Dec. 27, 2021.

(51) Int. Cl.
*H04B 1/10* (2006.01)
*H03F 1/56* (2006.01)
*H03F 3/19* (2006.01)
*H04L 5/14* (2006.01)

(52) U.S. Cl.
CPC ............. *H04B 1/10* (2013.01); *H03F 1/56* (2013.01); *H03F 3/19* (2013.01); *H04L 5/14* (2013.01); *H03F 2200/294* (2013.01); *H03F 2200/451* (2013.01)

(58) Field of Classification Search
CPC .......... H04B 1/10; H04B 1/0458; H04B 1/18; H04B 1/525; H03F 1/56; H03F 3/19; H03F 2200/294; H03F 2200/451; H03F 3/195; H03F 1/565; H04L 5/14
See application file for complete search history.

(56) References Cited

U.S. PATENT DOCUMENTS

| | | | | |
|---|---|---|---|---|
| 9,240,811 B2 * | 1/2016 | Norholm | ............... | H04B 1/56 |
| 9,887,727 B1 * | 2/2018 | Yokoyama | ............... | H04B 1/44 |
| 2010/0203844 A1 * | 8/2010 | Gorbachov | ............. | H03H 7/38 |
| | | | | 455/83 |
| 2011/0279193 A1 * | 11/2011 | Furutani | ............... | H03H 9/0566 |
| | | | | 333/132 |

* cited by examiner

*Primary Examiner* — John W Poos
(74) *Attorney, Agent, or Firm* — Chang & Hale LLP

(57) ABSTRACT

Technology is disclosed that systematically improves the noise figure (NF) on the receive path of front end architectures. The disclosed technologies tune the elements of the receive path in concert with one another to achieve superior or optimal NF performance. This may occur even where the NF performance of individual components is sub-optimal because it is the combination of the components that is tailored to provide superior or optimal NF performance. The disclosed technologies account for trade-offs in performance that arise when tuning individual components on the receive path, taking a holistic approach to the design of the receive path rather than focusing on optimizing individual elements or selected combinations of elements on the receive path.

20 Claims, 11 Drawing Sheets

NOISE FIGURE PERFORMANCE IN RECEIVE PATHS OF FRONT END MODULES

CROSS-REFERENCE TO RELATED APPLICATIONS

This application claims priority to U.S. Prov. App. No. 63/293,845 filed Dec. 27, 2021 and entitled "IMPROVING NOISE FIGURE PERFORMANCE IN RECEIVE PATHS OF FRONT END MODULES," which is expressly incorporated by reference herein in its entirety.

BACKGROUND

Field

The present disclosure generally relates to processing received radio frequency signals in front end modules.

Description of Related Art

Front end architectures in radio frequency devices are designed to receive and amplify signals in devices such as cellular phones. The performance of these architectures may be characterized by a number of factors, including the noise figure (NF). Noise figure (NF) is used to characterize the performance of a signal chain where lower numbers indicate superior performance. NF is related to the amount of noise introduced by components in the signal chain.

SUMMARY

According to a number of implementations, the present disclosure relates to a method for manufacturing a front end module with a targeted noise figure (NF) performance for a receive path. The method includes adjusting characteristics of an antenna switch module to reduce signal loss on the receive path. The method also includes adjusting characteristics of a receive filter of a duplexer to reduce signal loss through the receive filter. The method also includes adjusting an impedance of the receive filter of the duplexer. The method also includes adjusting a receive signal contour size, shape and location through the receive filter of the duplexer. The method also includes adjusting a value of a matching inductor between the duplexer and a low noise amplifier. The method also includes adjusting an impedance of the low noise amplifier. The method also includes producing a front end module having the adjusted characteristics of the antenna switch module and the receive filter of the duplexer, the adjusted impedance of the receive filter of the duplexer, the adjusted receive signal contour size, shape, and location, the adjusted value of the matching inductor, and the adjusted impedance of the low noise amplifier resulting in a realized NF performance.

In some embodiments, the method further includes determining an initial NF performance of an initial front end module configuration. In some embodiments, the realized NF performance is superior to the initial NF performance. In some embodiments, the realized NF performance is equal to or superior to the targeted NF performance. In some embodiments, responsive to determining that the realized NF performance is inferior to the targeted NF performance, the method further includes at least one of further adjusting characteristics of the antenna switch module, further adjusting characteristics of the receive filter of the duplexer, further adjusting the impedance of the receive filter of the duplexer, further adjusting the receive signal contour size, shape and location through the receive filter of the duplexer, further adjusting the value of the matching inductor between the duplexer and the low noise amplifier, or further adjusting the impedance of the low noise amplifier.

In some embodiments, adjusting characteristics of the antenna switch module includes reducing Coff for the antenna switch module. In some embodiments, adjusting characteristics of the antenna switch module includes tailoring a matching impedance of the antenna switch module to decrease a contribution to the realized NF performance by the antenna switch module. In some embodiments, reducing signal loss through the receive filter includes incorporating a duplexer with a hybrid design. In some embodiments, the impedance of the receive filter is adjusted to be between 60 Ohms and 90 Ohms In some embodiments, adjusting the receive signal contour size, shape, and location includes adjusting the receive signal contour to have a targeted size, shape, or location so that the receive signal contour lies within a target noise circle. In some embodiments, the value of the matching inductor is between 10 nH and 33 nH. In some embodiments, the impedance of the low noise amplifier is configured to provide a lower minimum NF relative to the value of the impedance prior to adjusting the impedance. In some embodiments, the impedance of the low noise amplifier is greater than 50 Ohms and less than or equal to 110 Ohms. In some embodiments, the method further includes increasing an impedance of traces on the front end module.

In some embodiments, the method further includes iteratively performing the method until achieving the targeted NF performance. In some embodiments, the adjusted characteristics of the antenna switch module are suboptimal in reducing a noise figure contribution of the antenna switch module. In some embodiments, the adjusted characteristics of the receive filter of the duplexer are suboptimal in reducing a noise figure contribution of the receive filter of the duplexer. In some embodiments, the adjusted value of the matching inductor is suboptimal in reducing a noise figure contribution of the matching inductor. In some embodiments, the adjusted impedance of the low noise amplifier is suboptimal in reducing a noise figure contribution of the low noise amplifier. In some embodiments, the realized NF performance is superior to a NF performance achieved by individually optimizing a NF performance of the antenna switch module, the receive filter of the duplexer, the matching inductor, and the low noise amplifier.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

DETAILED DESCRIPTION OF SOME EMBODIMENTS

Figure 1:
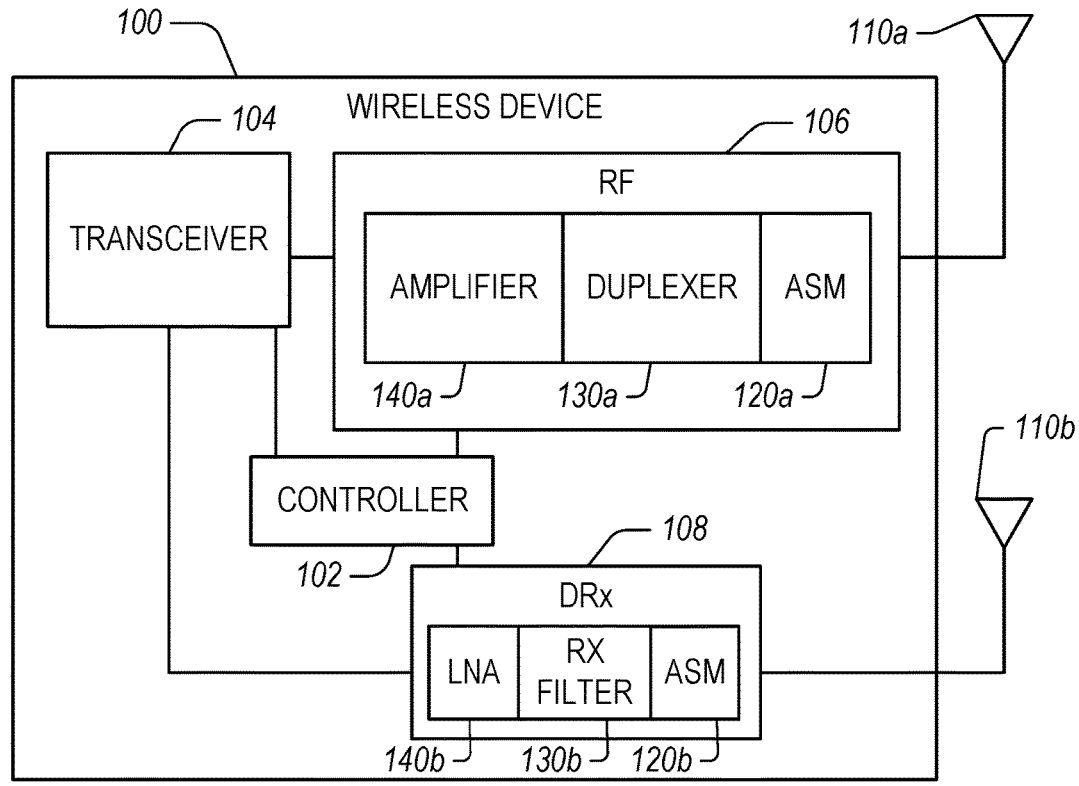
FIG. 1 illustrates a wireless device having a primary antenna and a diversity antenna.

The headings provided herein, if any, are for convenience only and do not necessarily affect the scope or meaning of the claimed invention.

Overview

Front end architectures in radio frequency devices are designed to receive and amplify signals in devices such as cellular phones. The performance of these architectures may be characterized by a number of factors, including the noise figure (NF). Noise figure (NF) is used to characterize the performance of a signal chain where lower numbers indicate superior performance. NF is related to the amount of noise introduced by components in the signal chain. It is desirable to reduce the NF of a signal path to improve performance.

NF performance of a receive path in a front end architecture is determined by several factors such as losses introduced by switches such as an antenna switch module (ASM), insertion losses at a receive (RX) filter of a duplexer, impedance of the RX filter of the duplexer, RX contour size and location (e.g., on a Smith chart), signal losses due to impedance matching components, and the NF of the amplifier on the receive path (e.g., a low noise amplifier or LNA). To improve the NF of the front end architecture, each of these contributions may be assessed and considered in the design of the components on the receive path of the architecture.

Typical design approaches improve the NF by adjusting impedance matching components to match the duplexer impedance so that the RX contours are close to a targeted noise circle of the LNA. This approach to improve front end NF performance is thus aimed at reducing receive path signal loss by improving impedance matching. In some instances, additional components may be required to achieve satisfactory performance, such as an additional capacitor. Although this may improve performance due to improved impedance matching, additional losses are introduced with additional components. Other approaches to improve NF performance may be directed at improving the NF of the LNA by designing the LNA to have a lower NF at higher impedance. This may also be combined with higher receive path impedance to match the higher impedance of the LNA. This may result in a lower NF. However, this approach ignores other factors that contribute to noise in the receive path. These traditional approaches to improve NF performance may be insufficient to meet year-over-year improvement goals dictated by the market.

Accordingly, disclosed herein are systems and methods to systematically improve NF performance on the receive path of front end architectures. The disclosed technologies tune the elements of the receive path in concert with one another to achieve superior or optimal NF performance. This may occur even where the NF performance of individual components is sub-optimal. This is because it is the combination of the components that is tailored to provide superior or optimal NF performance rather than optimizing individual contributions to the NF performance. The disclosed technologies account for trade-offs in performance that arise when tuning individual components on the receive path, taking a holistic approach to the design of the receive path rather than focusing on optimizing individual elements or selected combinations of elements on the receive path. The resulting front end architectures provide superior NF performance on the receive path relative to architectures tuned using typical approaches such as fine-tuning impedance matching to reduce receive path signal loss or adjusting the impedance of the LNA to have superior NF performance at higher impedances.

The disclosed technologies not only take filter and LNA contributions into account, but also consider each of the components on the receive path that affect NF performance and determine trade-offs in overall NF performance when tuning or optimizing individual components. For example, one trade-off is related to using fewer matching inductors, or having a lower impedance, to have less contour rotation (or a smaller amount of contour rotation) to reduce NF. The disclosed technologies tune or optimize NF performance by tuning the contributions of the components of the receive path while taking into account the effects each component has on the other components and the effect on the receive path as a whole. The disclosed technologies improve signal loss at the antenna switch module (ASM), improve impedance matching at the ASM, account for Coff at the ASM, reduce signal loss at the duplexer using a hybrid architecture, tune impedance at the duplexer to achieve a targeted contour rotation to a targeted LNA noise circle, tune the RX contour size and location to achieve a desirable rotation to the targeted LNA noise circle, tailor the value of the matching inductor between the duplexer and the LNA for a targeted RX contour size and location, adjust the NF of the LNA using a tailored impedance, and/or adjust the impedance of the traces on the receive path to provide a targeted impedance. By considering each of these contributions to the NF, the total NF of front end architecture can be improved or optimized.

The disclosed technologies enable consideration of the interplay of all these contributions to arrive at an improved or optimal NF for the front end architecture. In addition, the disclosed technologies enable identification of technological limitations that prevent further improvements in NF performance, e.g., filter architecture, RX impedance, RX contour size and location, etc. The disclosed technologies also enable identification of trade-offs that can be made to improve NF performance. In addition, the disclosed methodologies enable improved RX budget planning to thereby improve module design.

Wireless Devices and Front End Modules with Tuned NF Performance

FIG. 1 illustrates a wireless device 100 having a primary antenna 110a and a diversity antenna 110b. The wireless device 100 includes an RF module 106 and a transceiver 104 that may be controlled by a controller 102. The transceiver 104 is configured to convert between analog signals (e.g., radio-frequency (RF) signals) and digital data signals. To that end, the transceiver 104 may include a digital-to-analog converter, an analog-to-digital converter, a local oscillator for modulating or demodulating a baseband analog signal to or from a carrier frequency, a baseband processor that converts between digital samples and data bits (e.g., voice or other types of data), or other components.

The RF module 106 is coupled between the primary antenna 110a and the transceiver 104. Because the RF module 106 may be physically close to the primary antenna 110a to reduce attenuation due to cable loss, the RF module 106 may be referred to as a front end module (FEM). The RF module 106 may perform processing on an analog signal received from the primary antenna 110a for the transceiver 104 or received from the transceiver 104 for transmission via the primary antenna 110a. To that end, the RF module 106 includes an antenna switch module (ASM) 120a, one or more duplexers 130a, one or more amplifiers 140a (including power amplifiers (PAs) and low noise amplifiers (LNAs)) and may also include band select switches, attenuators, matching circuits, and other components. The ASM 120a may be connected to a plurality of duplexers 130a to enable operation across a plurality of frequency bands. The RF module 106 provides a receive path for signals received at the primary antenna 110a, the receive path including a signal path from the primary antenna 110a, to the ASM 120a, to the duplexers 130a, to the amplifiers 140a, to the transceiver 104. Similarly, the RF module 106 provides a transmit path for signals to be transmitted by the primary antenna 110a, the transmit path including a signal path from the transceiver 104, to the amplifiers 140a, to the duplexers 130a, to the ASM 120a, and to the primary antenna 110a for transmitting.

The controller 102 can be configured to generate and/or send control signals to other components of the wireless device 100. The controller 102 can be configured to receive signals from other components of the wireless device 100 to process to determine control signals to send to other components. In some embodiments, the controller 102 can be configured to analyze signals or data to determine control signals to send to other components of the wireless device 100.

When a signal is transmitted to the wireless device 100, the signal may be received at both the primary antenna 110a and the diversity antenna 110b. The primary antenna 110a and diversity antenna 110b may be physically spaced apart such that the signal at the primary antenna 110a and diversity antenna 110b is received with different characteristics. For example, the primary antenna 110a and the diversity antenna 110b may receive the signal with different attenuation, noise, frequency response, and/or phase shift. The transceiver 104 may use both of the signals with different characteristics to determine data bits corresponding to the signal. In some implementations, the transceiver 104 selects from between the primary antenna 110a and the diversity antenna 110b based on the characteristics, such as selecting the antenna with the highest signal-to-noise ratio. In some implementations, the transceiver 104 combines the signals from the primary antenna 110a and the diversity antenna 110b to increase the signal-to-noise ratio of the combined signal. In some implementations, the transceiver 104 processes the signals to perform multiple-input/multiple-output (MiMo) communication.

Because the diversity antenna 110b is physically spaced apart from the primary antenna 110a, the diversity antenna 110b can be coupled to the transceiver 104 by a transmission line, such as a cable or a printed circuit board (PCB) trace. In some implementations, the transmission line is lossy and attenuates the signal received at the diversity antenna 110b before it reaches the transceiver 104. Thus, in some implementations, gain is applied to the signal received at the diversity antenna 110b. The gain (and other analog processing, such as filtering) may be applied by the diversity receiver module 108. Because such a diversity receiver module 108 may be located physically close to the diversity antenna 110b, it may be referred to as a diversity receiver (DRx) front end module. The DRx module 108 includes components similar to the RF module 106, such as an ASM 120b, RX filters 130b, and LNAs 140b. Accordingly, each of the RF module 106 and the DRx module 108 include a receive path (or a signal path for received signals) from a corresponding antenna 110a, 110b to corresponding amplifiers 140a, 140b that passes through an ASM 120a, 120b to the duplexers or filters 130a, 130b.

The RF module 106 and the diversity receiver module 108 are examples of front end modules that incorporate the front end architectures described herein. These FEMs are tuned to provide improved or optimized NF performance along the receive path (e.g., from the antenna 110a, 110b to the amplifier 140a, 140b). Characteristics of the amplifiers 140a, 140b, duplexers 130a or RX filters 130b, and ASM 120a, 120b can be tailored to provide improved NF performance. In addition, impedance matching components along the receive path may also be tailored to improve NF performance. In addition, the disclosed technologies account for trade-offs in performance when tailoring the individual components to achieve improved overall NF performance rather than achieving improved performance for certain portions of the receive path. In other words, optimizing each component on the receive path does not necessarily lead to superior or optimized NF performance when considering the receive path as a whole. Thus, the disclosed technologies enable a holistic approach to tailoring the receive path.

Improving Receive Path NF Performance

Figure 2:
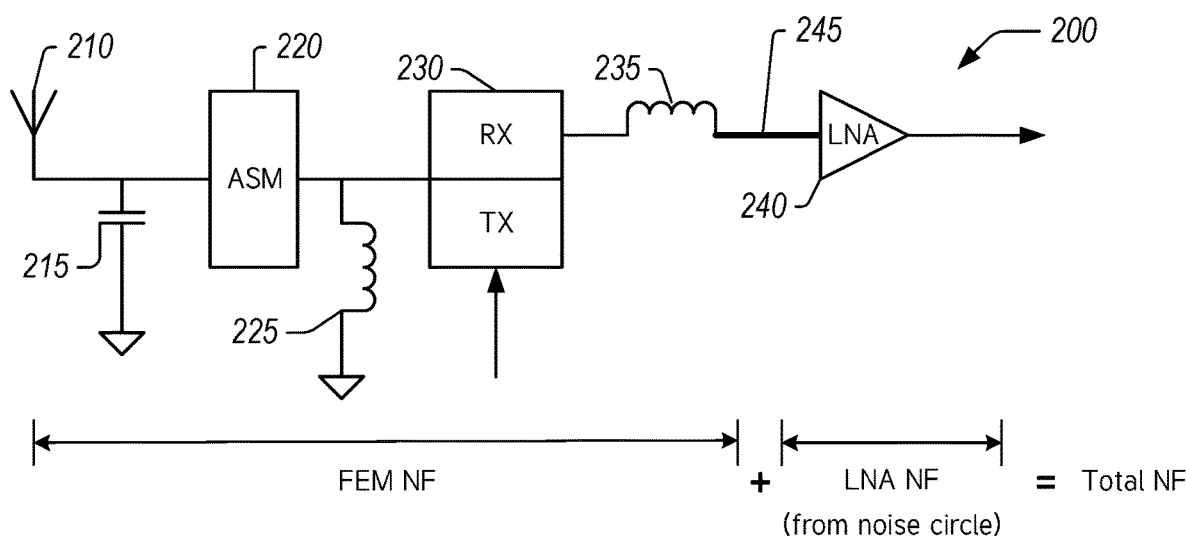
FIG. 2 illustrates an example receive path of a front end architecture.

FIG. 2 illustrates an example receive path 200 of a front end architecture. The receive path 200 includes an antenna 210 that receives a RF signal. The receive path 200 includes an ASM 220 configured to direct the received RF signal to a duplexer 230. The duplexer 230 filters the received RF signal and directs the filtered RF signal to an amplifier 240 (e.g., an LNA). The receive path 200 also includes various components to improve impedance matching such as a shunt inductor 225 between the ASM 220 and the duplexer 230 and a matching inductor 235 between the RX filter of the duplexer 230 and the LNA 240. In addition, the receive path 200 may implement traces 245 (e.g., multi-chip module or MCM traces) on the module or in the architecture that affect the receive signal. For example, the traces 245 may introduce impedance on the receive path 200. A shunt capacitor 215 between the antenna 210 and the ASM 220 can be used to represent the Coff of the ASM 220, although some receive paths include a shunt capacitor between the ASM 220 and the antenna 210.

The receive path 200 is illustrated with this simplified block diagram to identify factors that impact the overall NF of the receive path 200. A first part (a passive portion) of the receive path 200 is identified as contributing to the NF of the front end module (identified as FEM NF) and a second part (an active portion) of the receive path 200 is identified as the contribution to the NF by the LNA 240 (identified as the LNA NF), and the combination of the passive portion and the active portion results in the total NF of the receive path 200. The passive portion of the receive path 200 can be referred to as such due to the inclusion of passive components on the receive path. The active portion of the receive path 200 can be referred to as such due to the active device (the LNA 240) on the receive path 200.

The passive portion includes contributions from the ASM 220 (e.g., the off capacitance or Coff and insertion losses), the shunt inductor 225, the duplexer 230, and the matching inductor 235. Factors that affect the FEM NF include signal loss at the ASM 220, impact on the signal due to Coff of the ASM 220 (e.g., the shunt capacitor 215 representing Coff), signal loss through the RX filter of the duplexer 230, the signal contour size and location through the RX filter of the duplexer 230, impedance of the shunt inductor 225 and the RX filter of the duplexer 230, and signal loss through the matching inductor 235.

The active portion includes the LNA 240. The LNA NF affects the overall NF. The LNA NF may be understood by referencing the noise circle of the LNA 240. The noise circle of the LNA 240 indicates how much noise will be added to a signal amplified by the LNA 240. On a Smith chart, a signal that intersects a noise circle of lower noise will experience less introduced noise than a signal that intersects a noise circle of higher noise. The traces 245 may contribute to the NF in the passive portion, in the active portion, and/or when passing from the passive portion to the active portion of the receive path 200.

Accordingly, the disclosed technologies tailor the characteristics and values of the components on the receive path 200 to improve or optimize the total NF performance of the receive path 200. For example, increasing Coff of the ASM 220 expands the RX contour and may lead to a higher NF, so it is advantageous to decrease Coff to reduce the NF. As another example, reducing insertion loss at the RX filter of the duplexer 230 decreases the NF, so it is advantageous to use a duplexer with a hybrid design that reduces insertion losses. A duplexer with a hybrid design includes a filter (e.g., a surface acoustic wave or SAW filter) that incorporates a ladder structure in conjunction with a DMS (double mode SAW) structure. As another example, increasing the impedance at the RX filter of the duplexer 230 may result in a preferable signal contour rotation to a targeted noise circle associated with the LNA 240, so it is advantageous to use a duplexer with an RX filter that has a higher impedance. As another example, the shape, size, and location of the RX signal contour affects the NF, so it is advantageous to tailor these properties of the RX signal contour from the duplexer 230 because it leads to superior or optimal rotation to the targeted LNA noise circle. As another example, the value of the matching inductor 235 affects the NF and the value of the matching inductor 235 interacts with the RX contour size and rotation from the duplexer 230, so it is advantageous to tailor the value of the matching inductor 235 to complement the RX signal contour from the duplexer 230 to result in a desired rotation to a targeted noise circle. As another example, a higher impedance LNA results in a lower minimum NF, so it is advantageous to increase the impedance of the LNA 240 to improve the overall NF performance. As another example, implementing traces 245 with a higher impedance may also improve NF performance, so it is advantageous to use traces 245 with higher impedance to yield superior or optimal RX signal contour rotation to the targeted noise circle. Each of these design considerations is discussed in greater detail herein with reference to FIGS. 3-9.

Figure 3:
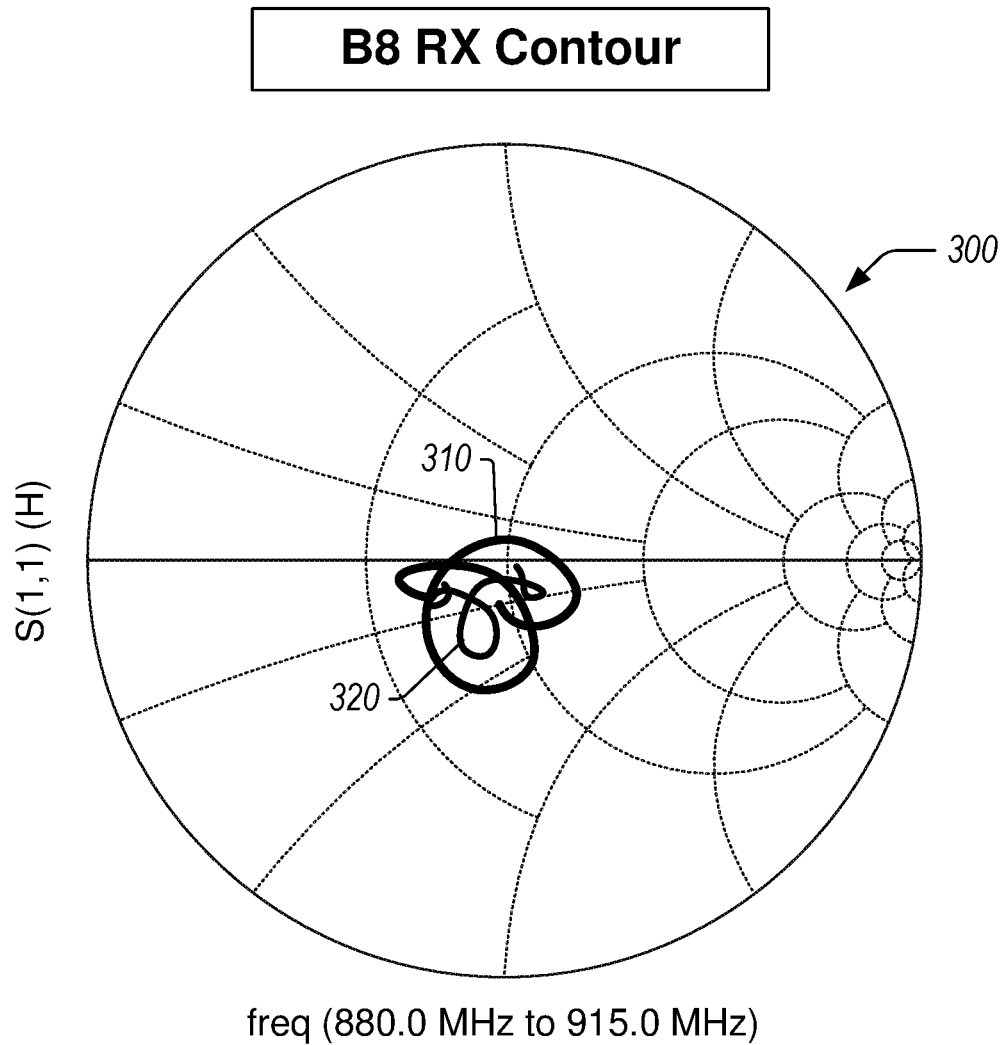
FIG. 3 illustrates an example of the impact on the RX signal contour of Coff of the ASM in the receive path.

FIG. 3 illustrates an example of the impact on the RX signal contour of Coff of the ASM in the receive path (e.g., Coff represented by the shunt capacitor 215 of the receive path 200 of FIG. 2). As used herein, RX signal contours can include the contours of received signals graphed on a Smith chart. Thus, changing the size, shape, and location of RX signal contours on a Smith chart can include adjusting one or more components in the receive path so that the RX signal contours are sized, shaped, and/or positioned in a targeted or desirable way on a Smith chart. This is advantageous in the context of improving NF performance because the resulting noise in the RX signals is reduced. In other words, the resulting performance of the receive path is improved because the received signals experience less signal loss and less noise introduction across the receive path. Thus, the targeted RX signal contours described herein represent improved impedance matching and reduced signal losses.

The smith chart 300 of FIG. 3 illustrates an RX signal contour for the frequency band B8 (e.g., a receive signal with a frequency between 880 MHz and 915 MHz). The larger contour 310 represents the RX signal contour with a Coff value of 0.5 pF from the ASM. The smaller contour 320 represents the RX signal contour with no residual Coff from the ASM. Thus, a larger Coff expands the RX signal contour. The larger RX signal contour leads to a higher total NF. Accordingly, it is advantageous to reduce the Coff value from the ASM.

Figure 4:
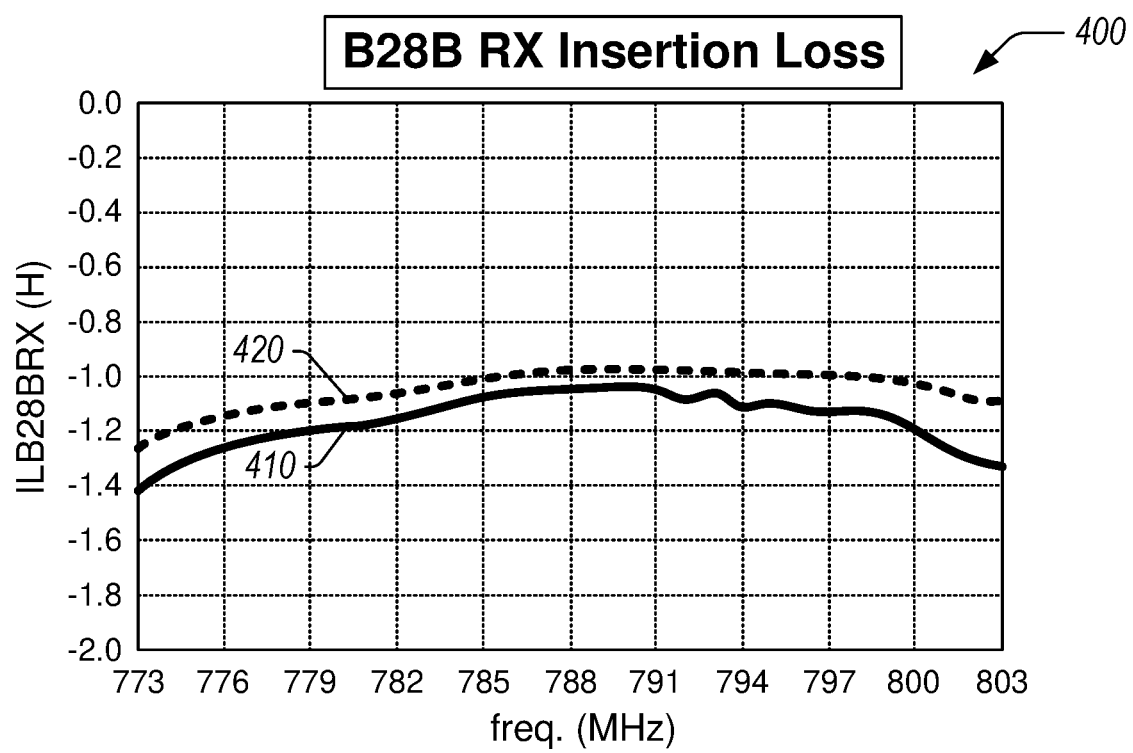
FIG. 4 illustrates a graph of an example of the impact of insertion loss of the RX filter of the duplexer.

FIG. 4 illustrates a graph 400 of an example of the impact of insertion loss of the RX filter of the duplexer (e.g., the duplexer 230 of the receive path 200 of FIG. 2). The solid line 410 represents a filter with higher insertion loss whereas the dashed line 420 represents a filter with a hybrid design with lower insertion loss. A decrease in insertion loss results in a decrease in NF. The hybrid design of the filter includes balancing the effects of a ladder-type filter design and a DMS filter design by combining the different structures of the filter in a single filter. The DMS portion typically increases impedance but also increases signal loss. The ladder portion typically gives lower loss but has a lower impedance. Thus, a hybrid design can be implemented that balances the undesirable signal loss of the DMS portion with the desirable increase in impedance by combining the DMS structure with a ladder structure. In some embodiments, it is advantageous to increase the impedance of the RX filter of the duplexer to be about 70 to 80 Ohms and may be greater than or equal to about 60 Ohms and/or less than or equal to about 90 Ohms.

Figure 5:
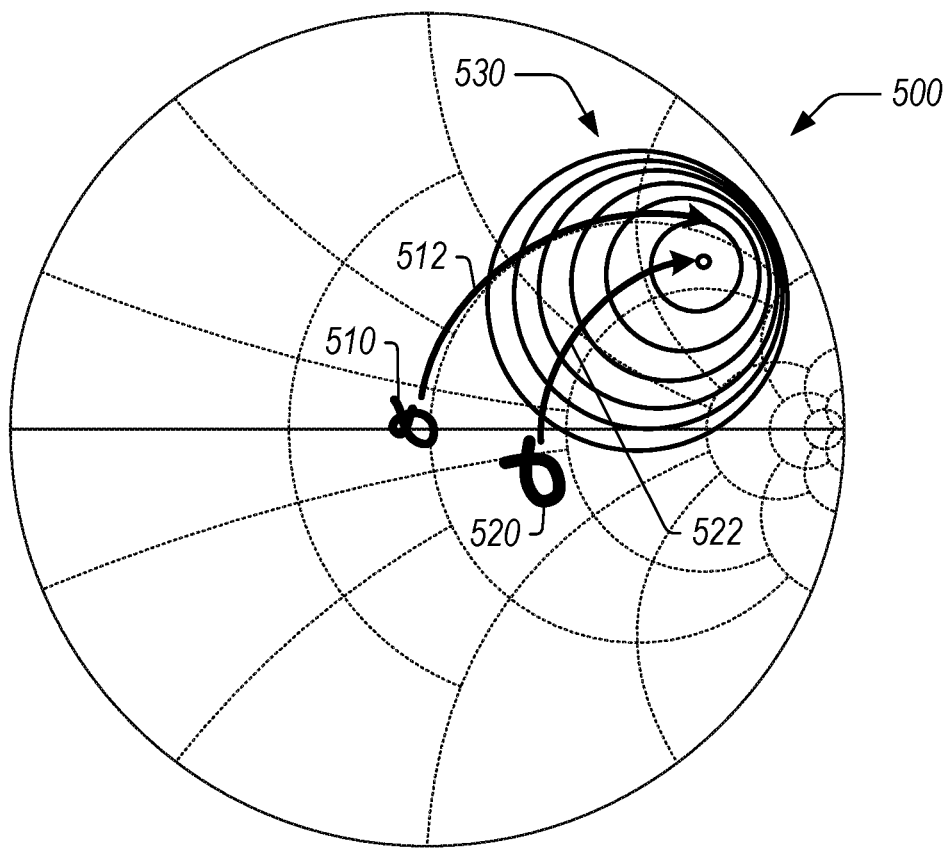
FIG. 5 illustrates an example of the impact on the RX signal contour of the impedance of the RX filter of the duplexer.

FIG. 5 illustrates an example of the impact on the RX signal contour of the impedance of the RX filter of the duplexer (e.g., the duplexer 230 of the receive path 200 of FIG. 2). The smith chart 500 illustrates an RX signal contour for the signal band B13 (e.g., a receive signal with a frequency between 746 MHz and 756 MHz). The Smith chart includes target NF circles 530 where different circles represent noise contributions ranging from 1.0 dB to 0.5 dB, where the size of the circle represents the amount of noise contributed by the LNA with smaller circles representing smaller noise contributions.

The smaller contour 510 represents an RX signal contour resulting from an RX filter impedance of 50 Ohms whereas the larger contour 520 represents an RX signal contour resulting from an RX filter impedance of 84 Ohms. Here, the larger impedance is superior because the RX signal contour 520 is in a more beneficial location such that it yields a superior contour rotation to the target NF circle 530. In particular, a rotation of the RX signal contour 520 along the path 522 will fall closer to the center of the target NF circles 530 than a rotation of the RX signal contour 510 along the path 512. Similarly, the rotation path 522 of the RX signal contour 520 is shorter than the rotation path 512 of the RX signal contour 510. As a result, it is advantageous to design the impedance of the RX filter of the duplexer to be higher than 50 Ohms with a beneficial value of the impedance being between about 60 Ohms and about 90 Ohms.

The higher impedance values may be beneficial due at least in part to the shorter and cleaner rotation of resulting RX signal contours to the target NF circle 530. Thus, although it may seem to be beneficial to tailor receive path components to decrease the RX signal contour size (e.g., as discussed with respect to FIG. 3), a larger RX contour size may be more beneficial with respect to the overall NF performance because it provides a superior rotation to the target NF circle. Accordingly, the disclosed technologies are configured to balance the impacts on NF performance of the size of the RX signal contour with the impacts on NF performance of the rotation of the RX signal contour into the NF noise circle to achieve superior or optimal overall NF performance.

Figure 6:
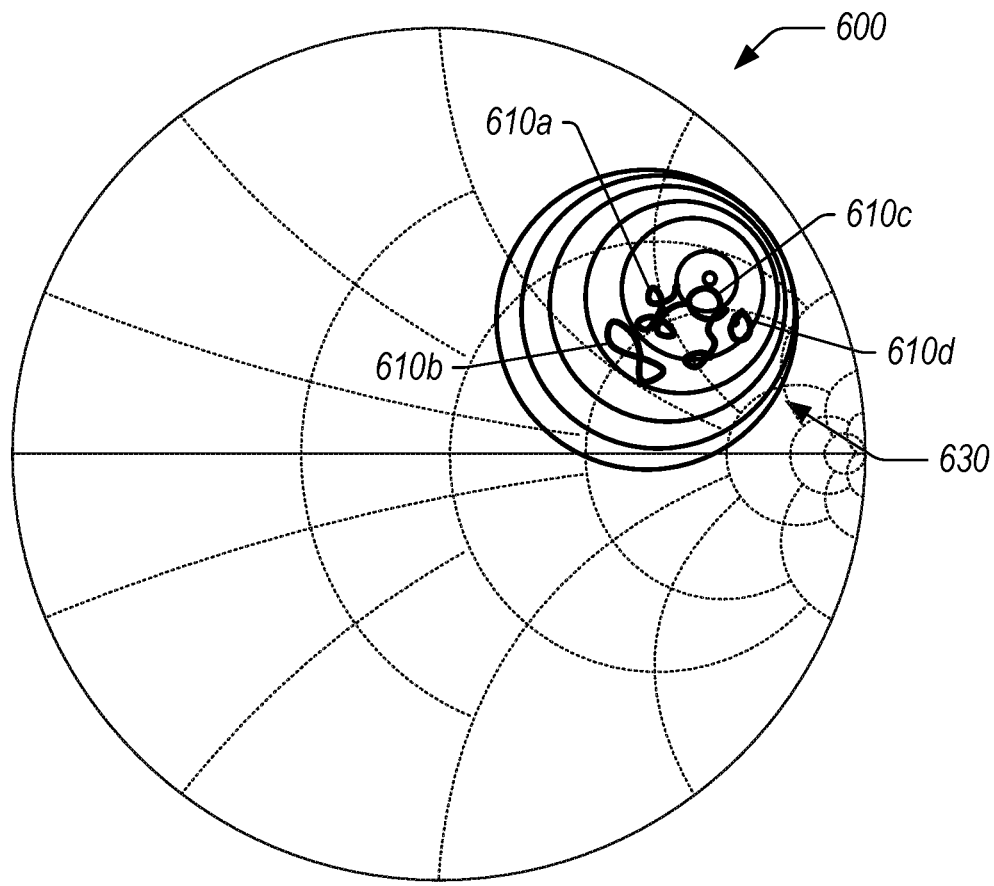
FIG. 6 illustrates an example of the impact of the shape, size, and position of RX signal contours as it relates to NF.

FIG. 6 illustrates an example of the impact of the shape, size, and position of RX signal contours as it relates to NF. Typically, front end architectures use a matching inductor to achieve targeted impedance matching to improve noise performance. The matching component is configured to achieve a targeted RX impedance rotation so that the RX signal contour falls into a target noise circle of the LNA. In some embodiments, it is desirable to align the matching impedance with the real impedance of the LNA. However, even with a targeted rotation, the size and shape of the RX signal contour affects NF performance. The size, shape, and location of the RX signal contour can be affected by the design of the RX filter of the duplexer. Thus, the properties of the RX filter can be tailored to achieve targeted characteristics of the RX signal contour, such as a targeted shape, size, and/or location.

The smith chart 600 illustrates four different example RX signal contours 610a-610d in relation to LNA noise circles 630 for the frequency band B28A (e.g., a receive signal with a frequency between 758 MHz and 788 MHz). The RX signal contours 610a-610d represent the RX signal contours on the receive path after the passive portion of the receive path (e.g., after the matching inductor between the duplexer and the LNA).

The first RX signal contour 610a illustrates that it is desirable to have the edges of the band (e.g., B28A) to fall in the lower noise circle to achieve superior NF performance. The starting and end points of the frequency band are desirable to place within a lower noise circle because other factors compensate for noise between the starting and end points of the RX signal contour. For example, signal losses through the filter are highest at the starting and ending frequencies of the frequency band making the contributions to the NF the highest for these frequencies. Thus, by placing the starting and ending frequencies in the lower NF circle, these increases in NF are compensated by the lower NF contribution of the LNA.

The second RX signal contour 610b illustrates that it is desirable to have an RX signal contour tilted on the Smith chart 600 as illustrated because it results in smaller NF variations over the frequency band. For example, the entirety of the RX signal contour 610b lies within the second and third LNA noise circles 630. In contrast, the same shape, if tilted 90 degrees, would overlap three or more noise circles, thereby increasing NF variations over the frequency band.

The third RX signal contour 610c illustrates that if the RX signal contour has an irregular shape, it is desirable to have the RX signal contour stretch toward the lower left of the Smith chart 600. This is because the noise circles have a larger spread in that direction (e.g., larger RX contours result in smaller NF variations). In contrast, an RX signal contour extending to the upper right would experience larger NF variations due to the noise circles being closer to one another in this direction.

The fourth RX signal contour 610d illustrates that the target or ideal RX signal contour shape is round and small. This is because a signal contour with these properties has less NF variation and can be rotated to fall within a smaller noise circle (e.g., it will have a smaller NF) than a larger or irregular-shaped signal contour.

The RX contours 610a-610d of the Smith chart 600 illustrate desirable characteristics for the RX signal contours from the duplexer. Thus, the RX filter of the duplexer can be tailored to provide RX signal contours with the desirable or advantageous characteristics described with respect to the four signal contours 610a-610d. These advantageous characteristics lead to desirable or optimal contour rotations to the targeted LNA noise circle thereby improving NF performance. Trade offs in performance include tailoring the RX filter to provide a preferable RX contour shape. In certain instances, this may lead to a larger RX contour than would typically be preferable, but because of the rotation and the properties of the noise circles, the resulting size and shape of the larger RX signal contour may improve NF performance relative to a smaller RX signal contour that has an undesirable position and/or shape.

The disclosed front end architectures can be configured to place the ending RX impedance of an RX signal contour within a target LNA noise circle by tailoring the RX filter of the plurality of duplexers along with adjusting or tailoring the other components along the receive path as described herein. Impedance rotation is related to the equation $j\omega L$, indicating that lower frequency bands rotate less than higher frequency bands. Thus, the RX impedances for lower frequency bands need to be less capacitive while the RX impedances for higher frequency bands need to be more capacitive. The duplexer can be tailored to adjust the RX filter so that RX impedance for the RX frequency band filtered by the duplexer lies within the target LNA noise circle after rotation caused by the matching inductor. In some embodiments, one or more of the RX resonators can be adjusted based on the frequency band that it is designed to filter. For example, the resonators can be implemented using a hybrid architecture that uses ladder-like structures and DMS structures. The LNA noise circle represents the amount of noise contributed by the LNA to a signal. The targeted LNA noise circle can be one that results in superior NF performance of the LNAs. In some embodiments, one or more of the resonators of the RX filter can be adjusted to achieve the targeted performance characteristics. For example, the last resonator of the RX filter can be adjusted to achieve a desired impedance location for the RX signal contours. In some embodiments, the duplexer comprises SAW resonators and/or acoustic filters.

Figure 7:
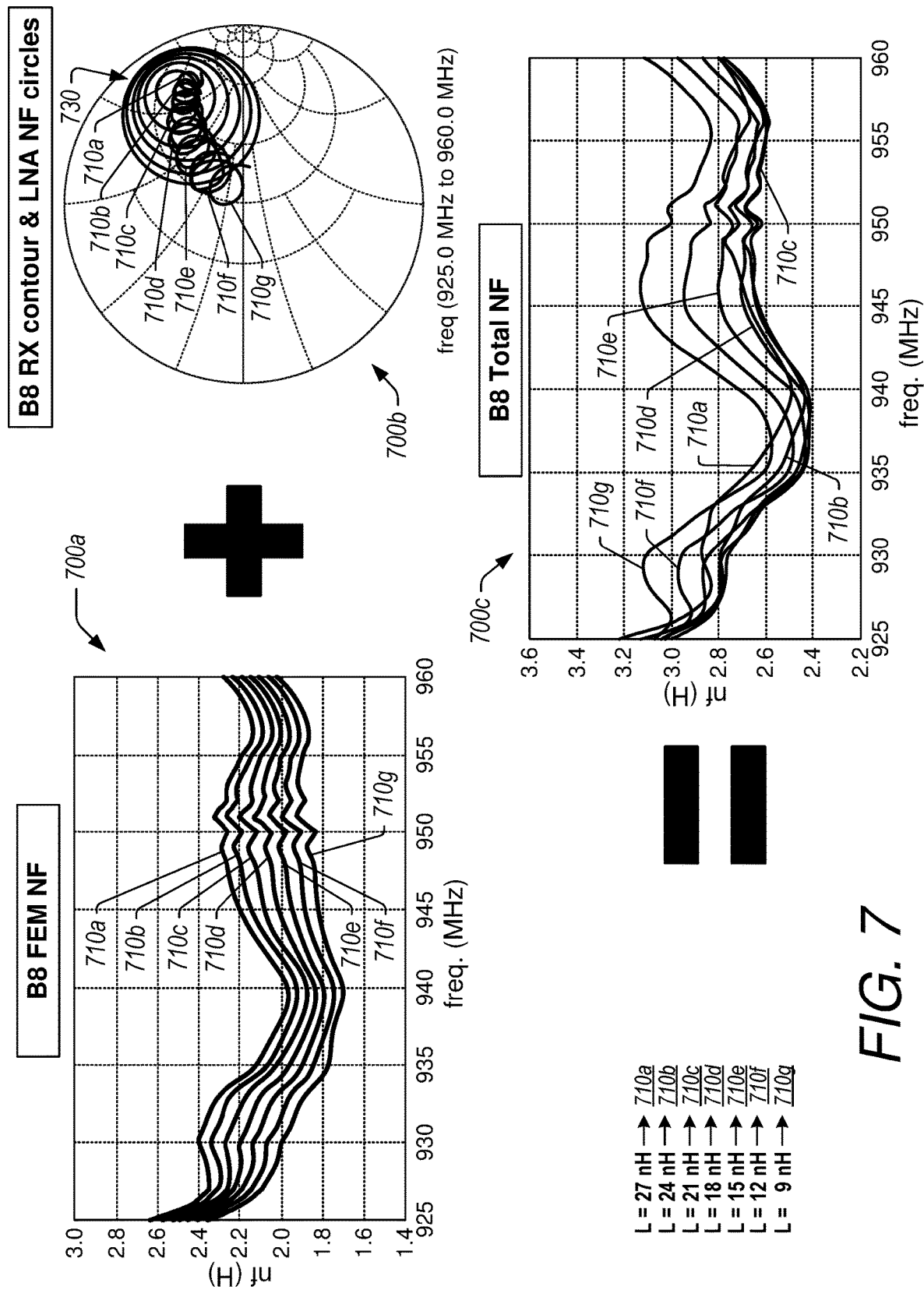
FIG. 7 illustrates a process for optimizing or tailoring the value of the matching inductor based on the properties of the other components on the receive path to achieve superior NF performance.

FIG. 7 illustrates a process for optimizing or tailoring the value of the matching inductor based on the properties of the other components on the receive path to achieve superior NF performance. The graphs illustrate the effects of the matching inductor on the receive path (e.g., the matching inductor 235 of the receive path 200 described with reference to FIG. 2). In each of the graphs, the lines 710a-710g correspond to values of the matching inductor ranging from 27 nH to 9 nH (i.e., the line 710a corresponds to an inductor value of 27 nH, the line 710b corresponds to an inductor value of 24 nH, the line 710c corresponds to an inductor value of 21 nH, the line 710d corresponds to an inductor value of 18 nH, the line 710e corresponds to an inductor value of 15 nH, the line 710f corresponds to an inductor value of 12 nH, and the line 710g corresponds to an inductor value of 9 nH).

The graph 700a illustrates the NF of the passive portion of the receive path. The NF is illustrated as a function of frequency in graph 700a for frequency band B8 (e.g., a signal with a frequency between 925 MHz and 960 MHz). The NF of the receive path with the matching inductor having a value of 27 nH is shown as the line 710a, the NF of the receive path with the matching inductor having a value of 24 nH is shown as the line 710b, the NF of the receive path with the matching inductor having a value of 21 nH is shown as the line 710c, the NF of the receive path with the matching inductor having a value of 18 nH is shown as the line 710d, the NF of the receive path with the matching inductor having a value of 15 nH is shown as the line 710e, the NF of the receive path with the matching inductor having a value of 12 nH is shown as the line 710f, and the NF of the receive path with the matching inductor having a value of 9 nH is shown as the line 710g. As illustrated, superior NF performance in the passive portion of the receive path is achieved using a lower impedance.

The graph 700b illustrates the RX signal contours 710a-710g and LNA noise circles 730 for the active portion of the receive path. The RX signal contours 710a-710g are illustrated for the frequency band B8. The RX signal contour of the receive path with the matching inductor having a value of 27 nH is shown as the line 710a, the RX signal contour of the receive path with the matching inductor having a value of 24 nH is shown as the line 710b, the RX signal contour of the receive path with the matching inductor having a value of 21 nH is shown as the line 710c, the RX signal contour of the receive path with the matching inductor having a value of 18 nH is shown as the line 710d, the RX signal contour of the receive path with the matching inductor having a value of 15 nH is shown as the line 710e, the RX signal contour of the receive path with the matching inductor having a value of 12 nH is shown as the line 710f, and the RX signal contour of the receive path with the matching inductor having a value of 9 nH is shown as the line 710g. As illustrated, superior NF performance in the active portion is achieved using a higher impedance, which is in contention with superior NF performance in the passive portion being achieved using a lower impedance, which what is indicated in the graph 700a.

The graph 700c illustrates the total NF of the entire receive path. The total NF is illustrated as a function of frequency in graph 700c for frequency band B8. The total NF of the receive path with the matching inductor having a value of 27 nH is shown as the line 710a, the total NF of the receive path with the matching inductor having a value of 24 nH is shown as the line 710b, the total NF of the receive path with the matching inductor having a value of 21 nH is shown as the line 710c, the total NF of the receive path with the matching inductor having a value of 18 nH is shown as the line 710d, the total NF of the receive path with the matching inductor having a value of 15 nH is shown as the line 710e, the total NF of the receive path with the matching inductor having a value of 12 nH is shown as the line 710f, and the total NF of the receive path with the matching inductor having a value of 9 nH is shown as the line 710g. When considering the combination of the passive portion and the active portion of the receive path, superior performance is achieved with an impedance between the highest impedance (27 nH) and the lowest impedance (9 nH).

As shown in the graphs 700a-700c, the matching inductor affects both portions of the receive path (e.g., the passive portion and the active portion). Decreasing the impedance generally reduces signal loss on the passive portion whereas larger impedances may provide superior impedance matching to the LNA to improve performance on the active portion. It is therefore desirable to tailor the matching inductor value to achieve superior performance when considering the receive path as a whole. The impedance of the matching inductor can be tailored to rotate the RX signal contour to a targeted LNA noise circle while simultaneously decreasing signal losses on the passive portion of the receive path.

Increasing the value of the matching inductor increases the amount of rotation of the RX signal contour. However, increasing the impedance typically increases the NF. Thus, it is desirable to decrease the amount of rotation required to rotate the RX signal contour to the targeted LNA noise circle. In the graph 700c, the matching inductor value of 21 nH (i.e., line 710c) provides superior NF performance whereas it did not provide superior performance in any individual portion of the receive path (e.g., the passive portion illustrated in graph 700a or the active portion illustrated in graph 700b). The superior NF performance is due at least in part to balancing the signal loss of the larger impedance (e.g., relative to the 9 nH impedance) with the amount of rotation required to land in a targeted noise circle (e.g., relative to the 27 nH impedance). In some embodiments, the value of the matching inductor can be greater than or equal to about 9 nH and/or less than or equal to about 35 nH, greater than or equal to about 10 nH and/or less than or equal to about 33 nH, or greater than or equal to about 12 nH and/or less than or equal to about 30 nH.

Figure 8:
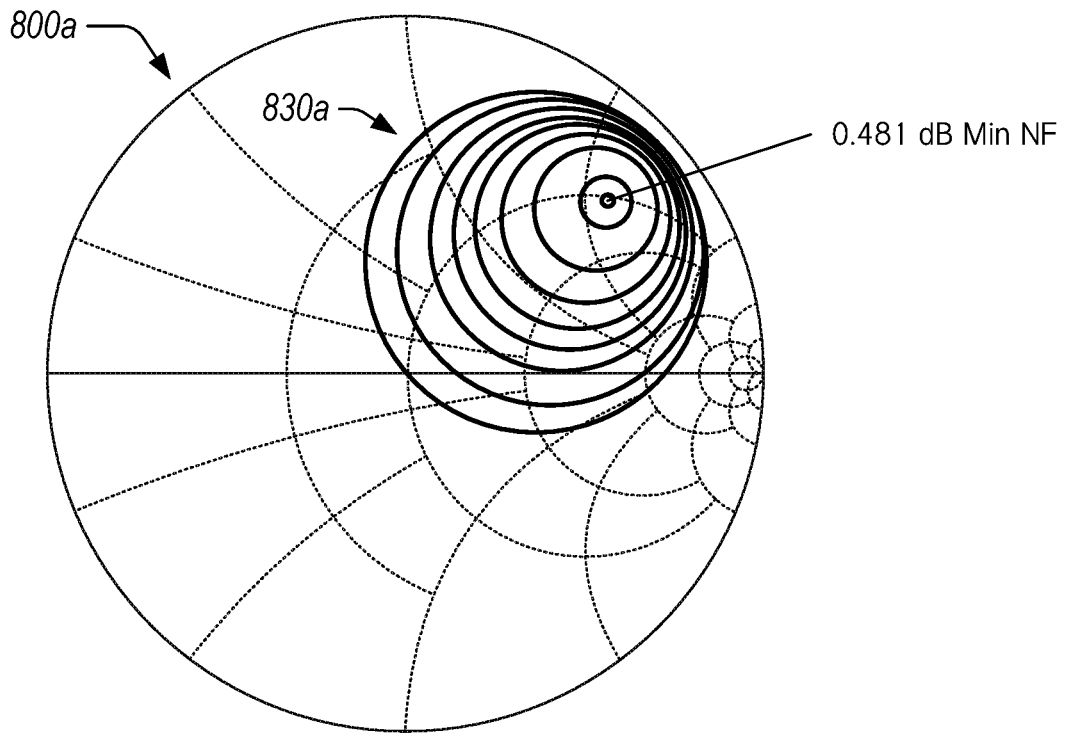
FIG. 8 illustrates the effects of the impedance of the LNA on the range of potential NF values.
Figure 8:
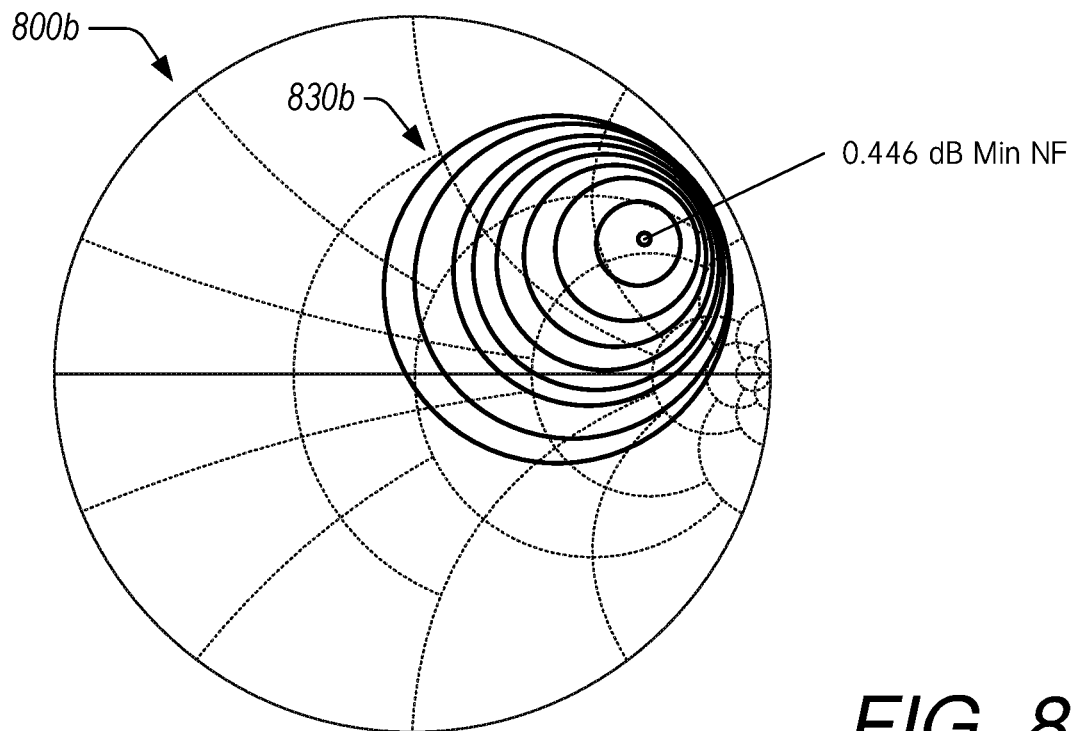

FIG. 8 illustrates the effects of the impedance of the LNA on the range of potential NF values. The Smith charts 800a, 800b illustrate noise circles for signals in the frequency band B8 (e.g., a signal with a frequency between 925 MHz and 960 MHz). The Smith chart 800a illustrates LNA noise circles 830a for an LNA with an impedance of 50 Ohms. The minimum NF for this LNA is 0.481 dB. The Smith chart 800b illustrates LNA noise circles 830b for an LNA with an impedance of 84 Ohms. The minimum NF for this LNA is 0.446 dB, superior to the LNA with an impedance of 50 Ohms. Thus, it may be desirable to increase the impedance of the LNA to improve NF performance. For example, the impedance of the LNA can be greater than 50 Ohms and/or less than or equal to about 110 Ohms, greater than or equal to about 60 Ohms and/or less than or equal to about 105 Ohms, or greater than or equal to about 70 Ohms and/or less than or equal to about 100 Ohms.

The noise circles 830a, 830b represent the amount of noise added by the LNA through the amplification process. Thus, having a smaller minimum NF value is preferable. Consequently, it is preferable to adjust the impedance of the LNA to achieve a lower minimum NF. In addition, the minimum NF point identified in the Smith chart 800a is near the impedance line corresponding to 50 Ohms whereas the minimum NF point identified in the Smith chart 800*b* is nearer 84 Ohms. Consequently, it typically requires a larger contour rotation to land within the smaller noise circles for an LNA with an impedance of 50 Ohms than an LNA with a higher impedance (e.g., comparing the radiuses of the circles of constant resistance, the 50-Ohm circle is larger than the 80-Ohm circle).

Figure 9:
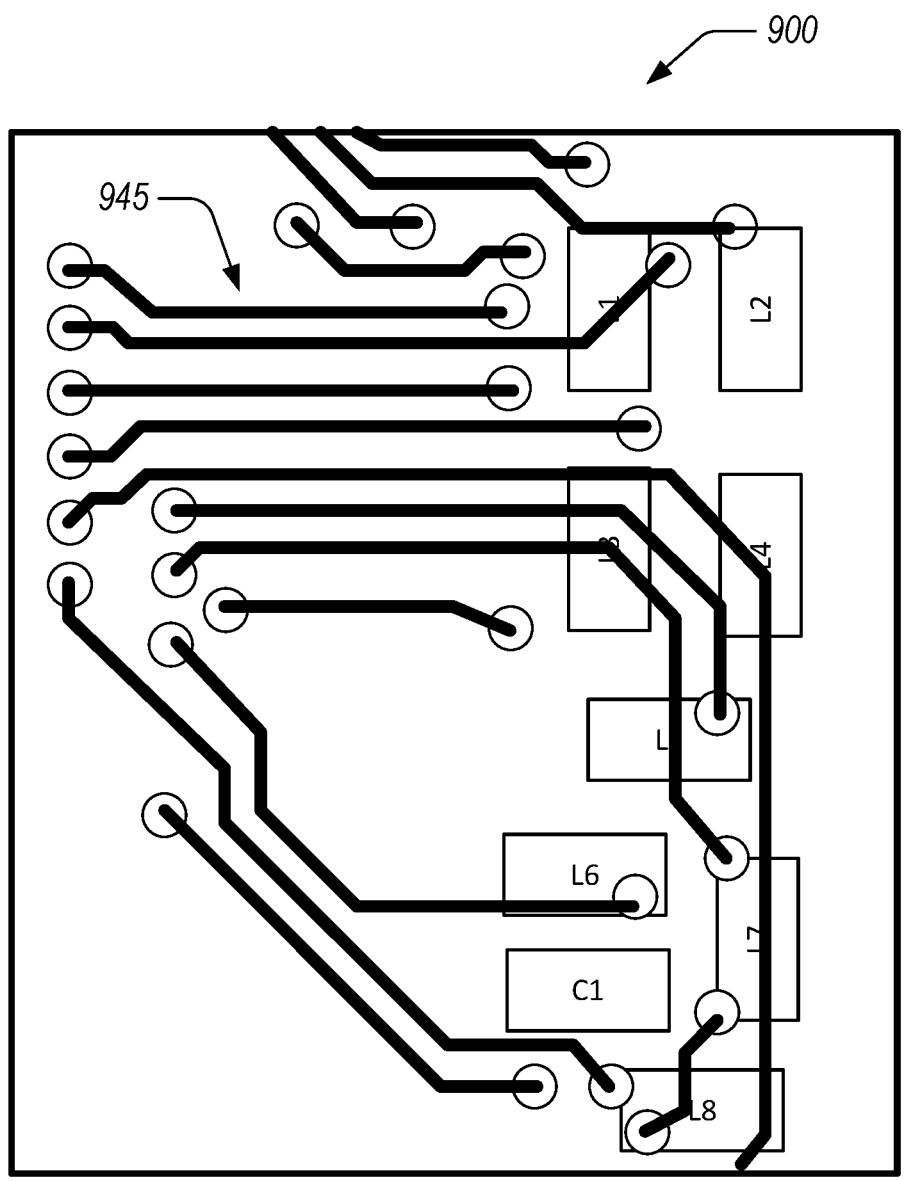
FIG. 9 illustrates an example of a front end module (e.g., a multi-chip module or MCM) with components such as inductors and capacitors.

FIG. 9 illustrates an example of a front end module 900 (e.g., a multi-chip module or MCM) with components such as inductors and capacitors. The front end module 900 includes MCM traces 945 that can be tailored to achieve targeted NF performance. For example, higher impedance traces can be used to yield superior RX signal contour rotations, as described herein. In some embodiments, it is desirable to increase the impedance of the traces connecting the matching inductor to the LNA. To increase the impedance, the thickness of the trace can be reduced. The impedance of the traces 945 affects the rotation of the RX signal contour to the targeted LNA noise circle. For example, the impedance of the traces 945 affects the trajectory of the rotation (e.g., the rotation may deviate from the circles of constant resistance on the Smith chart).

Example Method for Producing a Front End Architecture

Figure 10:
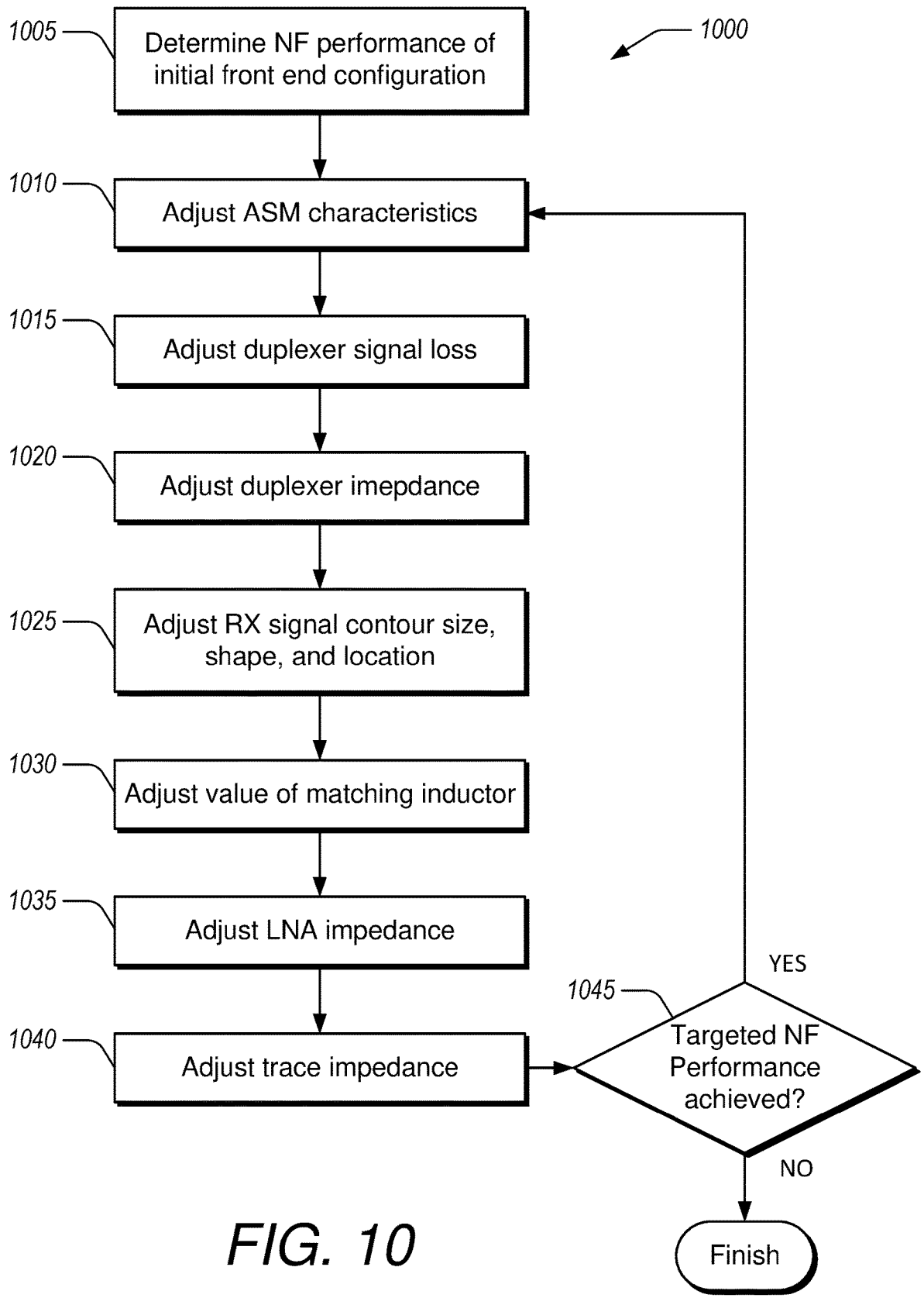
FIG. 10 illustrates an example method for producing a front end architecture using the approaches for improving or optimizing NF performance.

FIG. 10 illustrates an example method 1000 for producing a front end architecture using the approaches for improving or optimizing NF performance described herein with respect to FIGS. 2-9. The method 1000 is configured to produce a front end module or other front end architecture that improves NF performance by tailoring components on the receive path while accounting for trade-offs in performance.

In block 1005, the NF performance for a default or initial configuration is determined. In blocks 1010 through 1045, an iterative procedure for improving or optimizing NF performance of the front end architecture is performed.

In block 1010, the ASM characteristics are adjusted, examples of which are described herein with respect to FIG. 3. For example, the signal loss of the ASM can be tuned, the Coff can be tuned, and impedance matching at the ASM can be tuned. By tuning these characteristics, NF performance can be improved.

In block 1015, duplexer signal loss is adjusted, examples of which are described herein with respect to FIG. 4. For example, a hybrid architecture for the duplexer can be used that reduces signal loss. By reducing signal loss, NF performance can be improved.

In block 1020, duplexer impedance is adjusted, examples of which are described herein with respect to FIG. 5. By adjusting duplexer impedance, a superior or improved contour rotation can be accomplished. This contour rotation can be configured to rotate the RX signal contour to a targeted noise circle to improve NF performance. In some embodiments, the duplexer impedance can be adjusted to be between about 60 Ohms and about 90 Ohms.

In block 1025, the RX signal contour size, shape, and location are adjusted, examples of which are described herein with respect to FIG. 6. By adjusting the size, shape, and location of the RX signal contour, a superior or improved rotation to the targeted noise circle can be achieved. The size, shape, and location of the RX signal contour affects NF performance such that improving these characteristics by adjusting properties of the RX filter of the duplexer can lead to improved NF performance.

In block 1030, the value of the matching inductor is adjusted, examples of which are described herein with respect to FIG. 7. In some embodiments, one or more matching inductors and/or capacitors may be used, and, in such embodiments, the matching impedance is adjusted. As described herein, there are trade-offs in adjusting the matching impedance. It is desirable or advantageous to tailor the matching impedance value based at least in part on the RX signal contour size and location from the duplexer. This results in a superior or improved contour rotation to the targeted noise circle.

In block 1035, LNA impedance is adjusted, examples of which are described herein with respect to FIG. 8. In some embodiments, increasing the impedance of the LNA improves the potential minimum NF. By decreasing the potential minimum NF, the overall NF can be improved. In some embodiments, the impedance of the low noise amplifier is greater than about 50 Ohms and/or less than or equal to about 110 Ohms.

In block 1040, the impedances of the traces are adjusted, examples of which are described herein with respect to FIG. 9. In some embodiments, increasing trace impedance leads to improved NF performance. The impedance of the traces can be tailored to improve NF performance.

In block 1045, the NF performance of the front end architecture is analyzed and compared to the initial performance determined in block 1005. If the NF performance has improved sufficiently and/or if a targeted NF performance has been achieved, the front end architecture can be finished and manufactured based on the adjusted characteristics determined by the method 1000. If not, the iterative procedure can repeat by repeating one or more of the blocks 1010-1040.

In some embodiments, the adjusted characteristics of the antenna switch module are suboptimal in reducing a noise figure contribution of the antenna switch module. In other words, a superior noise figure performance through the antenna switch module may be achieved using optimal characteristics of the antenna switch module however the optimal characteristics may not achieve the targeted noise performance of the entire receive path. Similarly, in some embodiments, the adjusted characteristics of the receive filter of the duplexer are suboptimal in reducing a noise figure contribution of the receive filter of the duplexer. In other words, a superior noise figure performance through the receive filter of the duplexer may be achieved by optimizing NF performance of the receive filter of the duplexer, however, the optimized NF performance through the receive filter of the duplexer may not achieve the targeted noise performance of the entire receive path. Similarly, in some embodiments, the adjusted value of the matching inductor is suboptimal in reducing a noise figure contribution of the matching inductor. In other words, a superior noise figure performance through the matching inductor, between the duplexer and the low noise amplifier, may be achieved by optimizing the value of the matching inductor to optimize the noise figure through the matching inductor, however, the optimized value of the matching inductor may not achieve the targeted noise performance of the entire receive path. Similarly, in some embodiments, the adjusted impedance of the low noise amplifier is suboptimal in reducing a noise figure contribution of the low noise amplifier. In other words, a superior noise figure performance through the low noise amplifier may be achieved by optimizing the characteristics of the low noise amplifier, however, the optimized characteristics of the low noise amplifier may not achieve the targeted noise performance of the entire receive path. In some embodiments, the NF performance of the front end architecture achieved by performing the method 1000 is superior to a NF performance achieved by individually optimizing a NF performance of the antenna switch module, the receive filter of the duplexer, the matching inductor, and the low noise amplifier.

The method 1000 includes the design process for configuring a front end architecture. The disclosure also includes manufacturing a front end module or other component (e.g., for a wireless device) according to the resulting configuration of the front end architecture determined by the method 1000.

Examples of Products and Architectures

Figure 11:
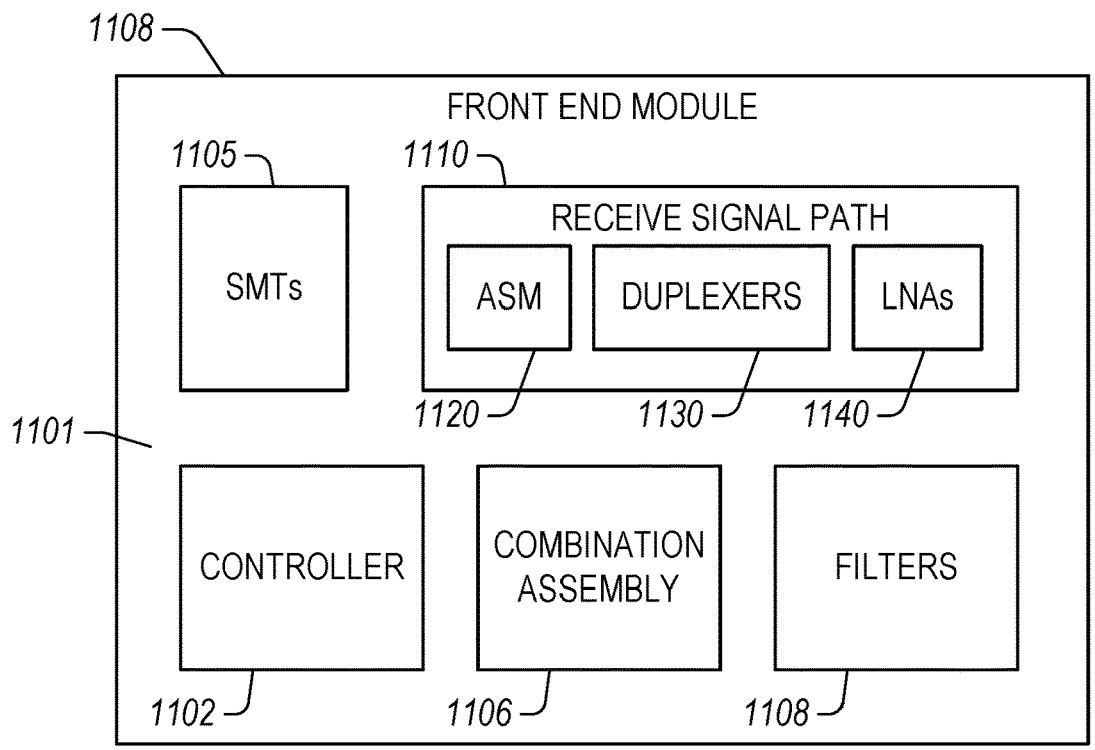
FIG. 11 illustrates that, in some embodiments, some or all of the front end configurations, including some or all of the receive path configurations having combinations of features, can be implemented, wholly or partially, in a module.

FIG. 11 illustrates that, in some embodiments, some or all of the front end configurations, including some or all of the receive path configurations having combinations of features (e.g., FIGS. 2-9), can be implemented, wholly or partially, in a module. Such a module can be, for example, a front end module (FEM). Such a module can be, for example, a diversity receiver (DRx) FEM. Such a module can be, for example, a multi-input, multi-output (MiMo) module.

In the example of FIG. 11, a module 1108 can include a packaging substrate 1101, and a number of components can be mounted on such a packaging substrate 1101. For example, a controller 1102 (which may include a front end power management integrated circuit [FE-PIMC]), a combination assembly 1106, a receive signal path 1110 that includes an ASM 1120, one or more duplexers 1130, and one or more amplifiers 1140 (e.g., LNAs), the receive signal path 1110 being configured as described herein to achieve superior or optimal NF performance. A filter bank 1108 (which may include one or more multiplexers) can be mounted and/or implemented on and/or within the packaging substrate 1101. Other components, such as a number of SMT devices 1105, can also be mounted on the packaging substrate 1101. Although all of the various components are depicted as being laid out on the packaging substrate 1101, it will be understood that some component(s) can be implemented over other component(s).

In some embodiments, the receive signal path 1110 can be implemented on a semiconductor die that is in turn mounted on the packaging substrate 1101. In further embodiments, the ASM 1120, the duplexers 1130, and/or the LNAs 1140 can be implemented on a single semiconductor die that is mounted on the packaging substrate 1101. In various embodiments, one or more of the ASM 1120, the plurality of duplexers 1130, or the LNAs 1140 are implemented on a semiconductor die with one or more of the other components mounted on a separate semiconductor die or on the packaging substrate 1101.

Figure 12:
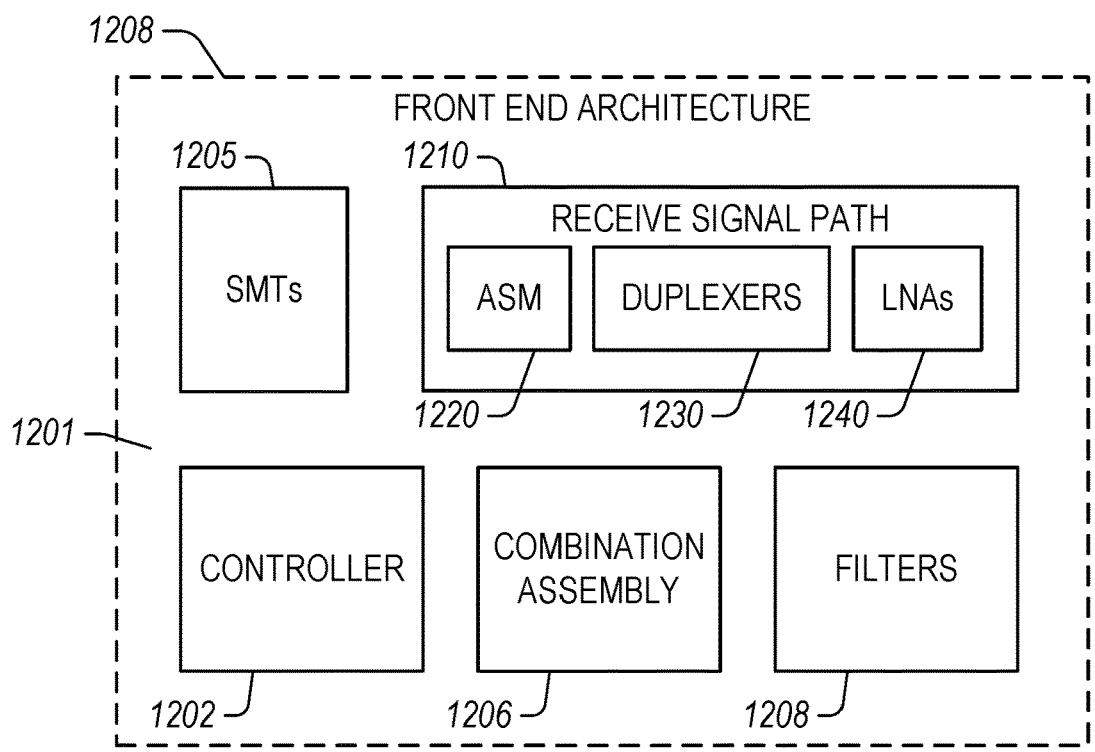
FIG. 12 shows that, in some embodiments, some or all of the front end configurations, including some or all of the receive path configurations having combinations of features, can be implemented, wholly or partially, in an architecture.

FIG. 12 shows that, in some embodiments, some or all of the front end configurations, including some or all of the receive path configurations having combinations of features (e.g., FIGS. 2-9), can be implemented, wholly or partially, in an architecture. Such an architecture may include one or more modules, and can be configured to provide front end functionality such as diversity receiver (DRx) front end functionality.

In the example of FIG. 12, an architecture 1208 can include a controller 1202 (which may include a front end power management integrated circuit [FE-PIMC]), a combination assembly 1206, a receive signal path 1210 that includes an ASM 1220, one or more duplexers 1230, and one or more amplifiers 1240 (e.g., LNAs), the receive signal path 1210 being configured as described herein to achieve superior or optimal NF performance. A filter bank 1208 (which may include one or more multiplexers) can be mounted and/or implemented on and/or within the packaging substrate 1201. Other components, such as a number of SMT devices 1205, can also be implemented in the architecture 1208.

In some implementations, a device and/or a circuit having one or more features described herein can be included in an RF electronic device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 13:
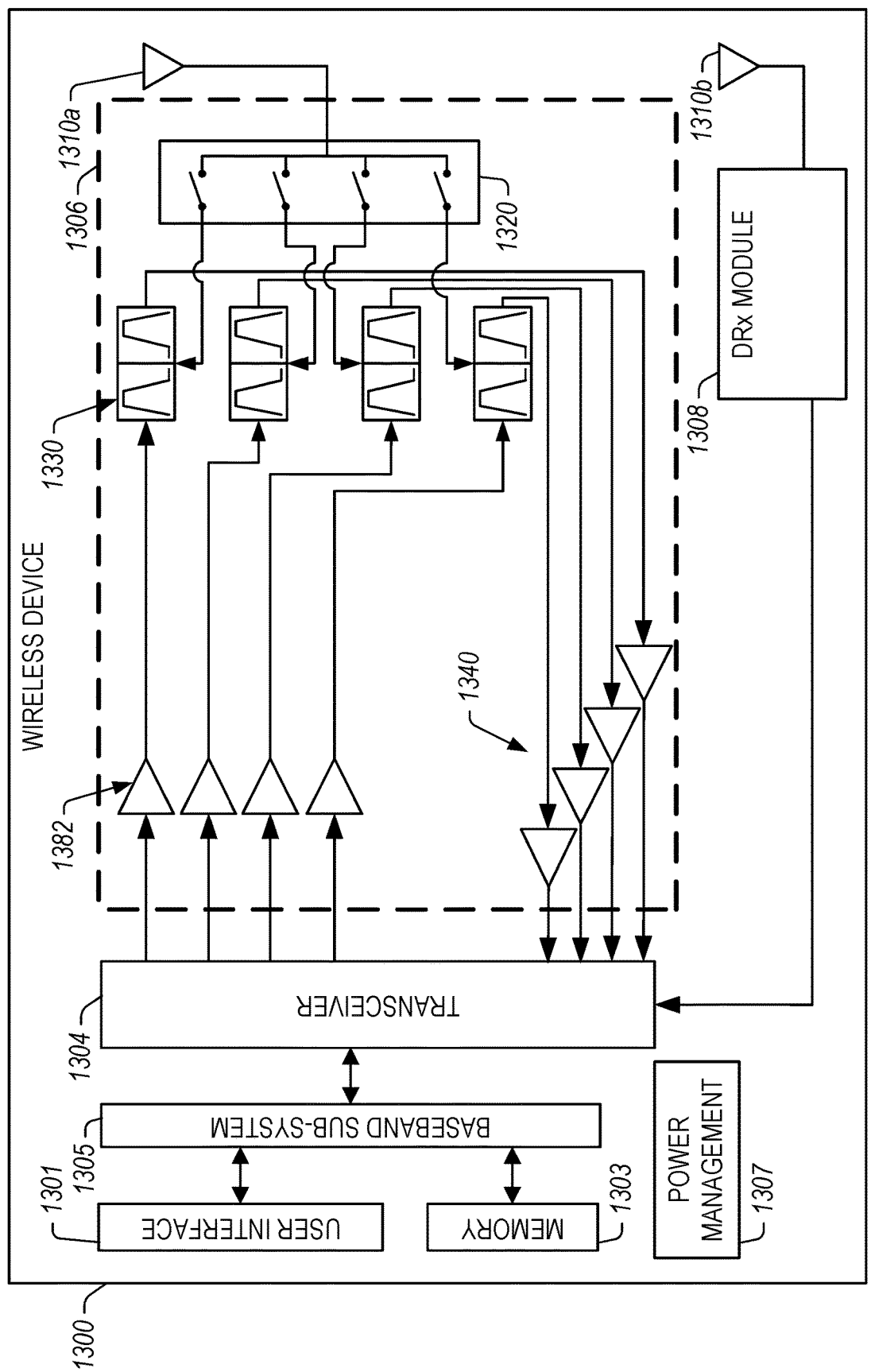
FIG. 13 depicts an example wireless device having one or more advantageous features described herein.

FIG. 13 depicts an example wireless device 1300 having one or more advantageous features described herein. In the context of one or more modules having one or more features as described herein, such modules can be generally depicted by a dashed box 1306 (which can be implemented as, for example, a front end module) and a diversity receiver (DRx) module 1308 (which can be implemented as, for example, a front end module).

Referring to FIG. 13, power amplifiers (PAs) 1382 can receive their respective RF signals from a transceiver 1304 that can be configured and operated to generate RF signals to be amplified and transmitted, and to process received signals. The transceiver 1304 is shown to interact with a baseband sub-system 1305 that is configured to provide conversion between data and/or voice signals suitable for a user and RF signals suitable for the transceiver 1304. The transceiver 1304 can also be in communication with a power management component 1307 that is configured to manage power for the operation of the wireless device 1300. Such power management can also control operations of the baseband sub-system 1305 and the modules 1306 and 1308.

The baseband sub-system 1305 is shown to be connected to a user interface 1301 to facilitate various input and output of voice and/or data provided to and received from the user. The baseband sub-system 1305 can also be connected to a memory 1303 that is configured to store data and/or instructions to facilitate the operation of the wireless device, and/or to provide storage of information for the user.

In the example wireless device 1300, outputs of the PAs 1382 are routed to their respective duplexers 1330. Such amplified and filtered signals can be routed to a primary antenna 1310a through an antenna switch module (ASM) 1320 for transmission.

Received signals are routed from the primary antenna 1310a, through the ASM 1320, through the duplexers 1330, to the amplifiers 1340, the receive paths configured to provide the features and benefits of the receive paths described herein. For clarity, impedance matching components are not illustrated but are to be understood as being present along the receive paths as described herein.

The wireless device also includes a diversity antenna 1310b and a diversity receiver module 1308 that receives signals from the diversity antenna 1310b. The DRx module 1308 includes receive paths similar to the front end module 1306 and may include an ASM, duplexers, and amplifiers. The diversity receiver module 1308 processes the received signals and transmits the processed signals to the transceiver 1304. In some embodiments, a diplexer, triplexer, or other multiplexer or filter assembly can be included between the diversity antenna 1310b and the diversity receiver module 1308.

One or more features of the present disclosure can be implemented with various cellular frequency bands as described herein. Examples of such bands are listed in Table 1. It will be understood that at least some of the bands can be divided into sub-bands. It will also be understood that one or more features of the present disclosure can be implemented with frequency ranges that do not have designations such as the examples of Table 1. It is to be understood that the term radio frequency (RF) and radio frequency signals refers to signals that include at least the frequencies listed in Table 1.

TABLE 1

| Band | Mode | TX Frequency Range (MHz) | RX Frequency Range (MHz) |
|---|---|---|---|
| B1 | FDD | 1,920-1,980 | 2,110-2,110b |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,110b |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B32 | FDD | N/A | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |
| B45 | TDD | 1,447-1,467 | 1,447-1,467 |
| B46 | TDD | 5,150-5,925 | 5,150-5,925 |
| B65 | FDD | 1,920-2,010 | 2,110-2,200 |
| B66 | FDD | 1,710-1,780 | 2,110-2,200 |
| B67 | FDD | N/A | 738-758 |
| B68 | FDD | 698-728 | 753-783 |
| B71 | FDD | 663-698 | 617-652 |

Additional Embodiments and Terminology

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for manufacturing a front end module with a targeted noise figure (NF) performance for a receive path, the method comprising:
    determining an initial NF performance of an initial front end module configuration;
    adjusting characteristics of an antenna switch module to reduce signal loss on the receive path;
    adjusting characteristics of a receive filter of a duplexer to reduce signal loss through the receive filter;
    adjusting an impedance of the receive filter of the duplexer;
    adjusting a receive signal contour size, shape and location through the receive filter of the duplexer;
    adjusting a value of a matching inductor between the duplexer and a low noise amplifier;
    adjusting an impedance of the low noise amplifier;
    producing a front end module having the adjusted characteristics of the antenna switch module and the receive filter of the duplexer, the adjusted impedance of the receive filter of the duplexer, the adjusted receive signal contour size, shape, and location, the adjusted value of the matching inductor, and the adjusted impedance of the low noise amplifier resulting in a realized NF performance, the realized NF performance being superior to the initial NF performance;
    responsive to determining that the realized NF performance is inferior to the targeted NF performance, the method further including at least one of further adjusting characteristics of the antenna switch module, further adjusting characteristics of the receive filter of the duplexer, further adjusting the impedance of the receive filter of the duplexer, further adjusting the receive signal contour size, shape and location through the receive filter of the duplexer, further adjusting the value of the matching inductor between the duplexer and the low noise amplifier, or further adjusting the impedance of the low noise amplifier.

2. The method of claim 1 wherein the realized NF performance is equal to or superior to the targeted NF performance.

3. The method of claim 1 wherein reducing signal loss through the receive filter includes incorporating a duplexer with a hybrid design.

4. The method of claim 1 wherein the impedance of the receive filter is adjusted to be between 60 Ohms and 90 Ohms.

5. The method of claim 1 wherein adjusting the receive signal contour size, shape, and location includes adjusting the receive signal contour to have a targeted size, shape, or location so that the receive signal contour lies within a target noise circle.

6. The method of claim 1 wherein the value of the matching inductor is between 10 nH and 33 nH.

7. The method of claim 1 wherein the impedance of the low noise amplifier is configured to provide a lower minimum NF relative to the value of the impedance prior to adjusting the impedance.

8. The method of claim 1 wherein the impedance of the low noise amplifier is greater than 50 Ohms and less than or equal to 110 Ohms.

9. The method of claim 1 further comprising increasing an impedance of traces on the front end module.

10. The method of claim 1 further comprising iteratively performing the method until achieving the targeted NF performance.

11. The method of claim 1 wherein the adjusted characteristics of the antenna switch module are suboptimal in reducing a noise figure contribution of the antenna switch module.

12. The method of claim 1 wherein the adjusted characteristics of the receive filter of the duplexer are suboptimal in reducing a noise figure contribution of the receive filter of the duplexer.

13. The method of claim 1 wherein the adjusted value of the matching inductor is suboptimal in reducing a noise figure contribution of the matching inductor.

14. The method of claim 1 wherein the adjusted impedance of the low noise amplifier is suboptimal in reducing a noise figure contribution of the low noise amplifier.

15. The method of claim 1 wherein the realized NF performance is superior to a NF performance achieved by individually optimizing a NF performance of the antenna switch module, the receive filter of the duplexer, the matching inductor, and the low noise amplifier.

16. A method for manufacturing a front end module with a targeted noise figure (NF) performance for a receive path, the method comprising:
adjusting characteristics of an antenna switch module to reduce signal loss on the receive path, adjusting characteristics of the antenna switch module including reducing Coff for the antenna switch module;
adjusting characteristics of a receive filter of a duplexer to reduce signal loss through the receive filter;
adjusting an impedance of the receive filter of the duplexer;
adjusting a receive signal contour size, shape and location through the receive filter of the duplexer;
adjusting a value of a matching inductor between the duplexer and a low noise amplifier;
adjusting an impedance of the low noise amplifier; and
producing a front end module having the adjusted characteristics of the antenna switch module and the receive filter of the duplexer, the adjusted impedance of the receive filter of the duplexer, the adjusted receive signal contour size, shape, and location, the adjusted value of the matching inductor, and the adjusted impedance of the low noise amplifier resulting in a realized NF performance.

17. The method of claim 16 wherein adjusting the receive signal contour size, shape, and location includes adjusting the receive signal contour to have a targeted size, shape, or location so that the receive signal contour lies within a target noise circle.

18. A method for manufacturing a front end module with a targeted noise figure (NF) performance for a receive path, the method comprising:
adjusting characteristics of an antenna switch module to reduce signal loss on the receive path;
adjusting characteristics of a receive filter of a duplexer to reduce signal loss through the receive filter;
adjusting an impedance of the receive filter of the duplexer;
adjusting a receive signal contour size, shape and location through the receive filter of the duplexer;
adjusting a value of a matching inductor between the duplexer and a low noise amplifier;
adjusting an impedance of the low noise amplifier; and
producing a front end module having the adjusted characteristics of the antenna switch module and the receive filter of the duplexer, the adjusted impedance of the receive filter of the duplexer, the adjusted receive signal contour size, shape, and location, the adjusted value of the matching inductor, and the adjusted impedance of the low noise amplifier resulting in a realized NF performance,
wherein adjusting characteristics of the antenna switch module includes tailoring a matching impedance of the antenna switch module to decrease a contribution to the realized NF performance by the antenna switch module.

19. The method of claim 18 wherein adjusting the receive signal contour size, shape, and location includes adjusting the receive signal contour to have a targeted size, shape, or location so that the receive signal contour lies within a target noise circle.

20. The method of claim 18 further comprising iteratively performing the method until achieving the targeted NF performance.

* * * * *